(No Model.)
L. B. WALKER & J. MURPHY.
WIND JACKET FOR BLAST FURNACES.
No. 520,719. Patented May 29, 1894.
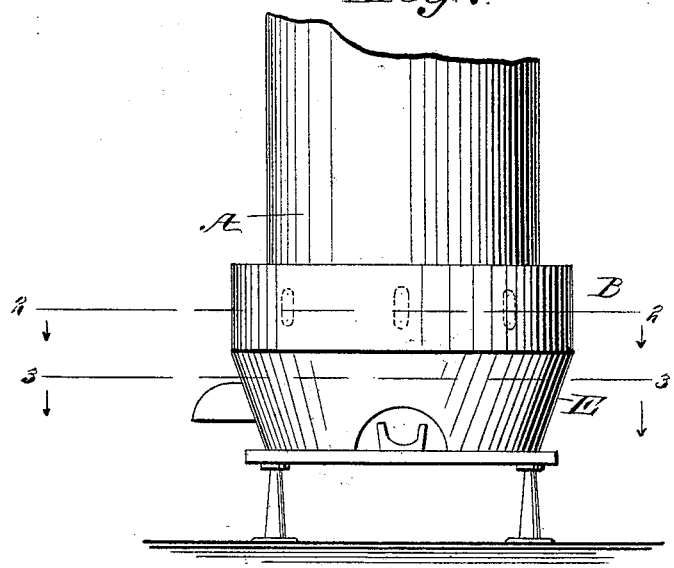
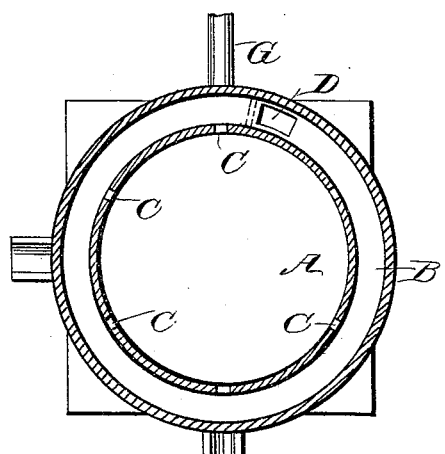
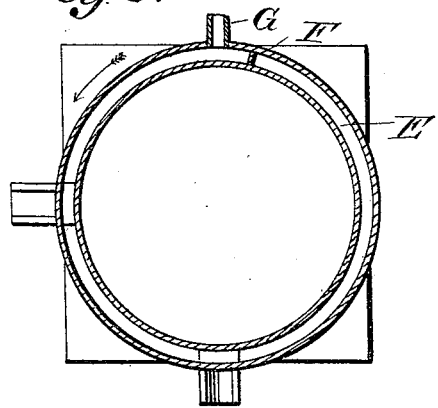
WITNESSES:
INVENTORS
L. B. Walker
J. Murphy
BY
Munn & Co
ATTORNEYS.

UNITED STATES PATENT OFFICE.

LOUIS B. WALKER AND JOHN MURPHY, OF GLOBE, ARIZONA TERRITORY.

WIND-JACKET FOR BLAST-FURNACES.

SPECIFICATION forming part of Letters Patent No. 520,719, dated May 29, 1894.

Application filed November 6, 1893. Serial No. 490,190. (No model.)

*To all whom it may concern:*

Be it known that we, LOUIS B. WALKER and JOHN MURPHY, both of Globe, in the county of Gila and Territory of Arizona, have invented a new and Improved Wind-Jacket for Blast-Furnaces, of which the following is a full, clear, and exact description.

The object of the invention is to provide a new and improved wind jacket for blast furnaces, which is simple and durable in construction, very effective in operation, and arranged to heat the blast previous to entering the wind box, and at the same time keeping the crucible cool to prevent over heating and thereby save wear and tear on the furnace.

The invention consists of certain parts and details, and combinations of the same, as will be fully described hereinafter and then pointed out in the claim.

Reference is to be had to the accompanying drawings, forming a part of this specification, in which similar letters of reference indicate corresponding parts in all the figures.

Figure 1 is a side elevation of the improvement as applied. Fig. 2 is a sectional plan view of the same on the line 2—2 of Fig. 1; and Fig. 3 is a similar view of the same on the line 3—3 of Fig. 1.

The furnace on which our improvement is applied, is of the usual construction, and is provided with the shaft A having a wind box B, surrounding the lower end of the shaft A and containing the usual tuyeres C, discharging into the interior of the shaft. In the bottom of the wind box B, is arranged an opening D, connecting the wind box B with a wind jacket E, likewise made circular and surrounding the crucible of the furnace. The wind jacket E is connected by the pipe G, with a suitable blast supply, the said pipe G entering the wind jacket near a partition F, located between the opening D and pipe G, so that the blast entering the wind jacket E through the said pipe G, will pass in one direction in the wind jacket as indicated by the arrow in Fig. 3, until it finally comes to the partition F and is thereby deflected upward and through the opening D into the wind box B, from which the blast passes through the tuyeres C, to the furnace in the usual manner. As shown in Fig. 1, the wind jacket E is arranged around the crucible and is provided with openings for the matte spout and the slag spout. By arranging the wind jacket E in the manner described, the blast is heated in passing through the jacket, as the latter surrounds the heated crucible and consequently, the blast takes considerable heat from the crucible to prevent overheating thereof. At the same time the blast passes in a heated state from the wind jacket into the wind box B, to finally pass in this condition to the charge in the furnace, by the tuyeres C.

Having thus fully described our invention, we claim as new and desire to secure by Letters Patent—

A furnace, provided with a crucible, a wind jacket surrounding the same, a wind box above the jacket, tuyeres leading from the wind box, a connection between the wind box and the jacket, an essentially vertical transverse partition located in the jacket adjacent to its connection with the wind box, and a blast supply pipe connected with the wind jacket on the opposite side of the partition from the connection leading to the wind box, whereby the air will be caused to travel around the crucible in the wind jacket, and then pass upward to the wind box and the tuyeres, substantially as described.

LOUIS B. WALKER.
JOHN MURPHY.

Witnesses:
N. S. BERRAY,
CHAS. T. MARTIN.